(12) United States Patent
Kim et al.

(10) Patent No.: US 7,881,731 B2
(45) Date of Patent: Feb. 1, 2011

(54) METHOD FOR PROVIDING TRIGGERED LOCATION INFORMATION OF A TARGET TERMINAL

(75) Inventors: Joo-Young Kim, Suwon-si (KR); Wuk Kim, Gwacheon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 910 days.

(21) Appl. No.: 11/758,333

(22) Filed: Jun. 5, 2007

(65) Prior Publication Data

US 2007/0287448 A1  Dec. 13, 2007

(30) Foreign Application Priority Data

Jun. 9, 2006  (KR)  ....................... 10-2006-0052235

(51) Int. Cl.
*H04W 24/00* (2009.01)
(52) U.S. Cl. ..................... 455/456.2; 455/456; 455/440
(58) Field of Classification Search ...... 455/456.1–457, 455/440, 414.2
See application file for complete search history.

(56) References Cited

U.S. PATENT DOCUMENTS

| | | |
|---|---|---|
| 2004/0253964 A1 | 12/2004 | Zhu |
| 2005/0255857 A1 | 11/2005 | Kim et al. |
| 2006/0025130 A1 | 2/2006 | Krishnamurthi et al. |

FOREIGN PATENT DOCUMENTS

| | | |
|---|---|---|
| EP | 1 635 603 A2 | 3/2006 |
| GB | 2 376 846 A | 12/2002 |

*Primary Examiner*—Lester Kincaid
*Assistant Examiner*—Sayed T Zewari
(74) *Attorney, Agent, or Firm*—Jefferson IP Law, LLP (57) ABSTRACT

A method for providing triggered location information of a target terminal is provided. The method includes transmitting by a previous H-SLP a report message informing that a target terminal is in a roaming state during the triggered location service to an H-SLP of the target terminal or the target terminal. The H-SLP of the target terminal selects a new V-SLP based on a location identifier (LID) received from the target terminal, and the H-SLP provides the V-SLP with an ID of the target terminal, a positioning method of the target terminal (SET CAPABLITY), and the LID as the information on the network in which the target terminal currently exists. The newly selected V-SLP determines the positioning method and protocol used for the positioning with the target terminal by using the SET CAPABILITY, the newly selected V-SLP transmits its own IP address and the newly determined positioning method and protocol (POSMETHOD) to the H-SLP. The H-SLP transmits the IP address of the newly selected H-SLP and the new POSMETHOD to the target terminal, the target terminal transmits a positioning inducing message to the new V-SLP and calculates a location value by using the determined POSMETHOD, in such a manner that the triggered location service is maintained even though the target terminal is in a roaming state during the service by performing the step of selecting the H-SLP for calculating the location value of the target terminal without interruption.

19 Claims, 4 Drawing Sheets

METHOD FOR PROVIDING TRIGGERED LOCATION INFORMATION OF A TARGET TERMINAL

PRIORITY

This application claims the benefit under 35 U.S.C. §119 (a) of a Korean patent application filed in the Korean Industrial Property Office on Jun. 9, 2006 and assigned Serial No. 2006-0052235, the entire disclosure of which is hereby incorporated by reference.

BACKGROUND OF THE INVENTION

1. Field of the Invention

The present invention relates to a method for providing triggered location information of a target terminal. More particularly, the present invention relates to a method for providing triggered location information of a target terminal when a location server for calculating a location value should be changed due to movement of the target terminal while a triggered location service is provided.

2. Description of the Related Art

The present invention addresses a situation in which a location server for calculating a location value of a target terminal should be changed due to movement of the target terminal while a triggered location service is provided. In a triggered location service, a location value of a target terminal is repeatedly calculated by a location server. Also, the location value is repeatedly calculated for a specific time interval which may be any length of time including a few days or more. In some situations, the target terminal moves and the location server used for calculating a previous location value can no longer be used. In such an event, the location server should be changed while the triggered location service is provided.

In the prior art, after a location server is determined, the determined location server performs positioning with the target terminal. More specifically, before the triggered location service (positioning) starts, the target terminal is already in a roaming state, and an appropriate location server is selected by a home location server while the terminal is in the roaming state. During the triggered location service, the determined location server is not changed. Accordingly, if the location server and the target terminal exchange the message previously and calculate the location value during the triggered location service, the previous location server cannot calculate the location value when the target terminal moves during the triggered location service. Therefore, the current triggered location service is interrupted. A detailed description of the prior art uses the context of CHAPTER 5.4.1.9.2 of OMA AD SUPL V2_0 20060307-D.

In the prior art, before the triggered location service starts and a location value of the target terminal is determined, the location server is selected and connected to the terminal. The determined location server was not changed even with movement of the terminal. As such, if the terminal moved during the location service and the location value could not be calculated by the determined location server, the current triggered location service session may be interrupted. If the current triggered location service session was interrupted, a request must be made to the location server for a new triggered location service session. That is, the prior art does not address the situation in which the location server must be changed due to movement of the target terminal. In order to interrupt the current triggered location service and start the session again, it is necessary to inform a location service agent of the interruption of the current service, and to request the service again.

SUMMARY OF THE INVENTION

An aspect of the present invention is to address the above-mentioned problems and/or disadvantages occurring in the prior art and to provide at least the advantages described below. Accordingly, an aspect of the present invention is to provide a method for calculating a location value by changing a location server without interrupting a current triggered location service session when the target terminal moves and the target terminal cannot calculate the location value with a previous location server.

Another aspect of the present invention is to provide a method for providing continuous service by selecting an appropriate location server by a home location server when the target terminal is in a roaming state while a location value of the target terminal is calculated and the triggered location service is in progress.

Yet another aspect of the present invention is to provide a method for calculating a location value and re-determining a protocol when changing the location server without discontinuing the session of the current triggered location service.

In accordance with an aspect of the present invention, a method for providing triggered location information is provided. The method includes requesting a location value of the target terminal by a Secure User Plane Location AGENT (SUPL AGENT), exchanging a location service start message between a Home SUPL Location Platform (H-SLP) and the target terminal, selecting a Visited SUPL Location Platform server (V-SLP) for calculating the location value in the location of the target terminal, transmitting information necessary for calculating a periodic location value of the target terminal to the selected V-SLP by the H-SLP, determining a positioning method (POSMETHOD) used for calculating the location value with the target terminal, transmitting the information of the V-SLP to the H-SLP by the V-SLP, transmitting the information of the V-SLP and the POSMETHOD to the target terminal by the H-SLP, transmitting a positioning inducing message to the V-SLP according to a positioning period by the target terminal, calculating the location value of the target terminal by the target terminal and the V-SLP, transmitting the calculated location value of the target terminal to the H-SLP by the V-SLP and transmitting the calculated location value of the target terminal to the SUPL AGENT by the H-SLP.

In accordance with another aspect of the present invention, a method for providing triggered location information is provided. The method includes transmitting, by a target terminal, a location value request message, evaluating the location value request message, determining if the target terminal is within a range in which the target terminal can perform the positioning by the H-SLP, selecting a V-SLP for calculating a location value of the target terminal when the target terminal is out of range, transmitting information necessary for calculating a periodic location value of the target terminal to the selected V-SLP by the H-SLP, determining a positioning method (POSMETHOD) used for calculating the location value with the target terminal, transmitting the information of the V-SLP to the H-SLP by the V-SLP, transmitting the information of the V-SLP and the POSMETHOD to the target terminal by the H-SLP, transmitting a positioning inducing message to the V-SLP by the target terminal according to a positioning period, calculating the location value of the target terminal by the target terminal and the V-SLP and transmitting the calculated location value of the target terminal to the H-SLP by the V-SLP.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A system for providing triggered location information according to an exemplary embodiment of the present invention includes the following components.

1) A Secure User Plane Location AGENT (SUPL AGENT) requests a Home SUPL Location Platform (H-SLP) for triggered location service using establishing criteria. In the triggered location service, criteria refer to a periodic interval and a kind of a desired service in the triggered service, e.g., a time-periodic triggered location service or a position-changing triggered location service.

2) The H-SLP transmits the triggered location service to the SUPL AGENT based on the location value of the target terminal according to the SUPL AGENT's request. The H-SLP determines a period for the positioning during the triggered location service and waits for a positioning start message transmitted from the target terminal. If the H-SLP fails to receive the positioning start message within a specific time interval from the beginning of the corresponding period, it transmits a positioning inducing message to the target terminal. Or, if the H-SLP receives a request for the triggered location service (SET INITIATED CASE) from the target terminal, it memorizes a corresponding period and determines if the positioning start message from the target terminal arrives within the corresponding period. And, if the positioning start message does not arrive within the period, the H-SLP transmits the positioning inducing message to the target terminal.

3) If the target terminal receives a request for triggered location service from the H-SLP, it memorizes a corresponding period and transmits the positioning start message to the H-SLP according to the period. Alternatively, the target terminal receives the triggered location service request from the SUPL AGENT and requests the H-SLP for the triggered location service (SET INITIATED CASE). Here, a Visited SUPL Location Platform server (V-SLP) refers to the H-SLP located in the visited network in which the target terminal exists.

Figure 1:
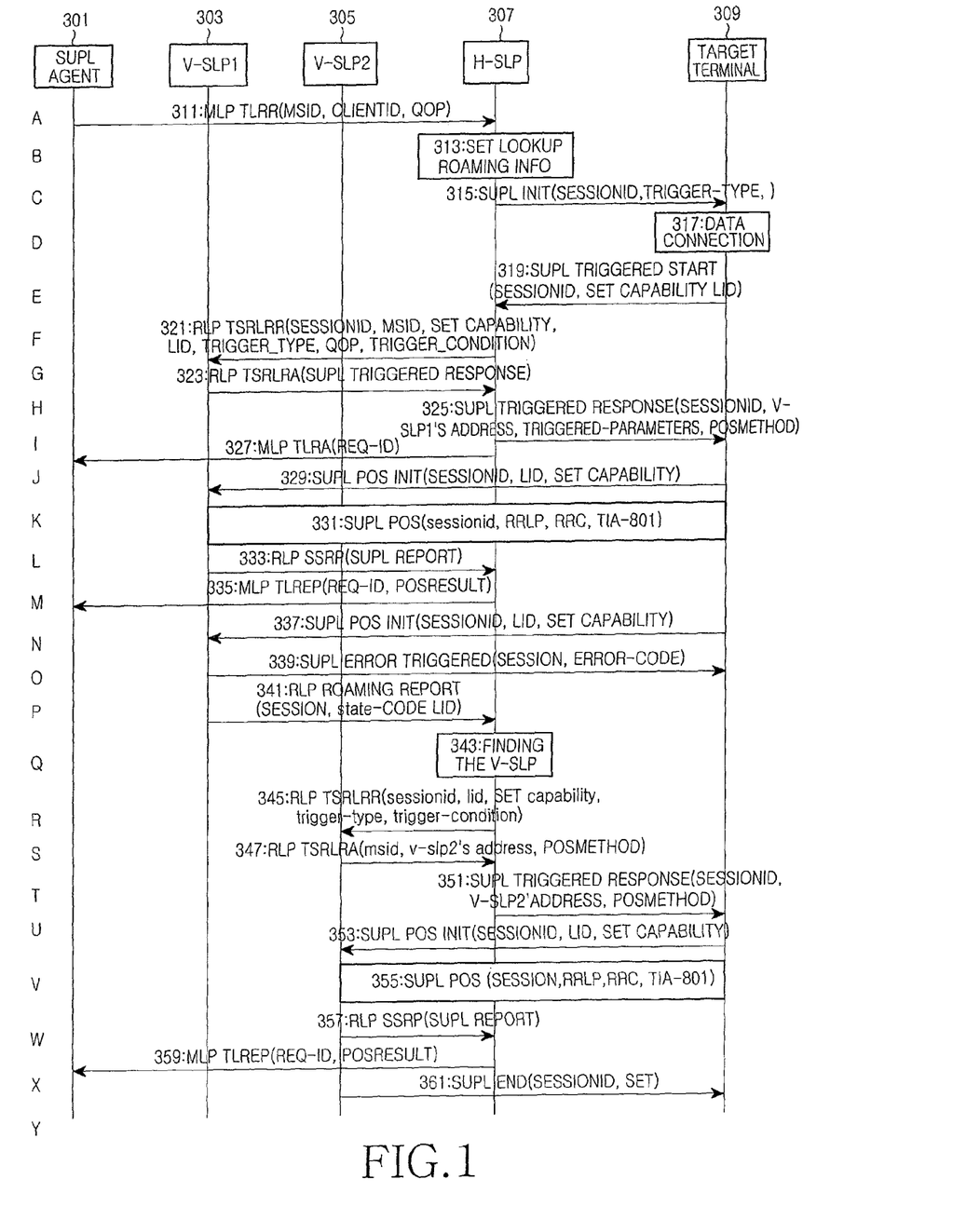
FIG. 1 is a flowchart illustrating an operating procedure of calculating a location value of a target terminal when a Secure User Plane Location AGENT (SUPL AGENT) in a network requests a Home SUPL Location Platform (H-SLP) for the location value of a target terminal according to an exemplary embodiment of the present invention.

FIG. 1 is a flowchart illustrating an operating procedure of calculating a location value of a target terminal when an SUPL AGENT in a network requests an H-SLP for the location value of the target terminal according to an exemplary embodiment of the present invention. Referring to FIG. 1, the procedure of calculating the location value of the target terminal according to the exemplary embodiment of the present invention is as follows.

A. The SUPL AGENT 301 requests the H-SLP 307 for a location value of a target terminal 309. The SUPL AGENT 301 sends a message including a Mobile Subscriber Identity (MSID) as an identity of the target terminal, a CLIENT ID identifying the connection, and a Quality of Position (QOP) indicating the accuracy of the location value in step 311.

B. The H-SLP 307, having registered information of the target terminal 309 and a PRIVACY PROFILE of a user of the target terminal, determines if the target terminal is within a range in which the H-SLP can determine the location value in step 313.

C. The H-SLP 307 transmits a triggered location service start message to the target terminal 309 in step 315. The message includes a SESSION ID identifying the communication session between the H-SLP 307 and the target terminal 309 and a TRIGGER-TYPE indicating a triggered location service type.

D. The target terminal 309 connects to a PACKET DATA NETWORK in order to transmit a response to the H-SLP 307 in step 317.

E. The target terminal 309 transmits a message allowing the start of the triggered location service in step 319. The message includes the SESSION ID, a SET CAPABILITY indicating the method and protocol of performing the positioning by the target terminal and a Location Identifier (LID) including information on the network in which the target terminal currently exists.

F. In step 321, the H-SLP 307 determines a V-SLP to function as a new H-SLP for calculating the location value of the target terminal based on the LID transmitted through step 319, and transmits information necessary for calculating the periodic location value with the target terminal to the determined location server (V-SLP 1) 303. The information includes the SESSION ID, the MSID of the target terminal, the SET CAPABILITY, LID, a TRIGGERED-TYPE representing a kind of the triggered location service, a QOP and the criteria of the triggered location service TRIGGER-CONDI- TION (a service start time, an end time, a location value reporting period, the accuracy of the location value or the like).

G. The visited location server (V-SLP1) 303 determines a method and protocol for the positioning (POSMETHOD) used for calculating the location value with the target terminal by using the positioning method from the target terminal 309. The V-SLP 1 303 transmits the determined POSMETHOD, the SESSION ID, an IP address of the V-SLP1, and an ID of the V-SLP1 to the H-SLP in step 323.

H. The H-SLP 307 transmits the IP address of the V-SLP1 for the positioning to the target terminal 309, the ID of the V-SLP1 and the POSMETHOD in step 325.

I. The H-SLP 307 reports to the SUPL AGENT that the requested triggered location service is allowed to start by transmitting a REQ-ID in step 327.

J. In step 329 the target terminal 309 transmits the positioning inducing message to the V-SLP1 303 according to the positioning period together with the LID as the information on the network in which the target terminal currently exists. In an alternative embodiment, the LID may be implemented with a CELL ID.

K. The target terminal 309 and the V-SLP1 303 determine the location value in step 331.

L. The V-SLP1 303 transmits the location value to the H-SLP 307 in step 333.

M. The H-SLP 307 transmits the location value to the SUPL AGENT 301 in step 335.

N. The target terminal 309 transmits the positioning inducing message to the V-SLP1 303 based on the positioning period together with the LID as the information on the network in which the target terminal currently exists in step 337.

O. The V-SLP1 303 determines if it is out of range of the location in which the V-SLP1 performs the positioning based on the LID received from the target terminal. If the V-SLP1 303 is out of range for positioning, it transmits an error message to the target terminal in step 339. The message includes an error code indicating that the positioning cannot be performed.

P. The V-SLP1 303 reports the message informing that the V-SLP1 and the target terminal cannot calculate the location value due to the movement of the target terminal to the H-SLP in step 341. The message includes the error code and the LID received from the current target terminal.

Q. The H-SLP 307 selects a location server for calculating the location value in which the current target terminal exists based on the LID as the target terminal in step 343.

R. In step 345, the H-SLP 307 requests a selected location server (V-SLP 2) 305 to calculate the location value and provides the LID as the information on the network in which the target terminal currently exists, the SET-CAPABILITY, the TRIGGERED-TYPE and the TRIGGER CONDITION.

S. In step 347, the visited SUPL location platform server (V-SLP2) 305 allows the positioning request and transmits its own IP address to the H-SLP 307. Also, by using the SET CAPABILITY that indicates the method and protocol for the positioning of the target terminal, the new visited location server (V-SLP2) 305 and the positioning method used by the target terminal (POSMETHOD) are determined. The determined POSMETHOD is transmitted to the H-SLP 307.

T. The H-SLP 307 transmits the IP address of the newly selected visited location server and the POSMETHOD to the target terminal in step 351.

U. The target terminal 309 transmits the positioning inducing message to the new visited location server in step 353. The message includes the information on the network in which the target terminal exists.

V. In step 355, the V-SLP2 305 and the target terminal 309 calculate the location value by using the POSMETHOD that was determined in step T.

W. The calculated location value is transmitted to the H-SLP in step 357.

X. The H-SLP transmits the calculated location value to the SUPL AGENT 301 in step 359.

Y. In step 361, the V-SLP2 305 reports the interruption of the session together with the SUPL to the target terminal 309.

Those steps of determining the location value explains the method for providing the triggered location service. In order to determine the location value according to the period of the target terminal, steps J and K may be repeated. However, when the previous location server cannot calculate the location value of the positioning due to movement of the target terminal, the target terminal performs steps N to V according to the exemplary method of the present invention. Steps N to U are the steps of searching for the new location server and preparing for determining the location value by the target terminal and the new location server. Accordingly, when the previous location server cannot calculate the location value, the target terminal performs steps N to U, and then calculates the location value with the newly determined location server by repeating steps U to X.

Figure 2:
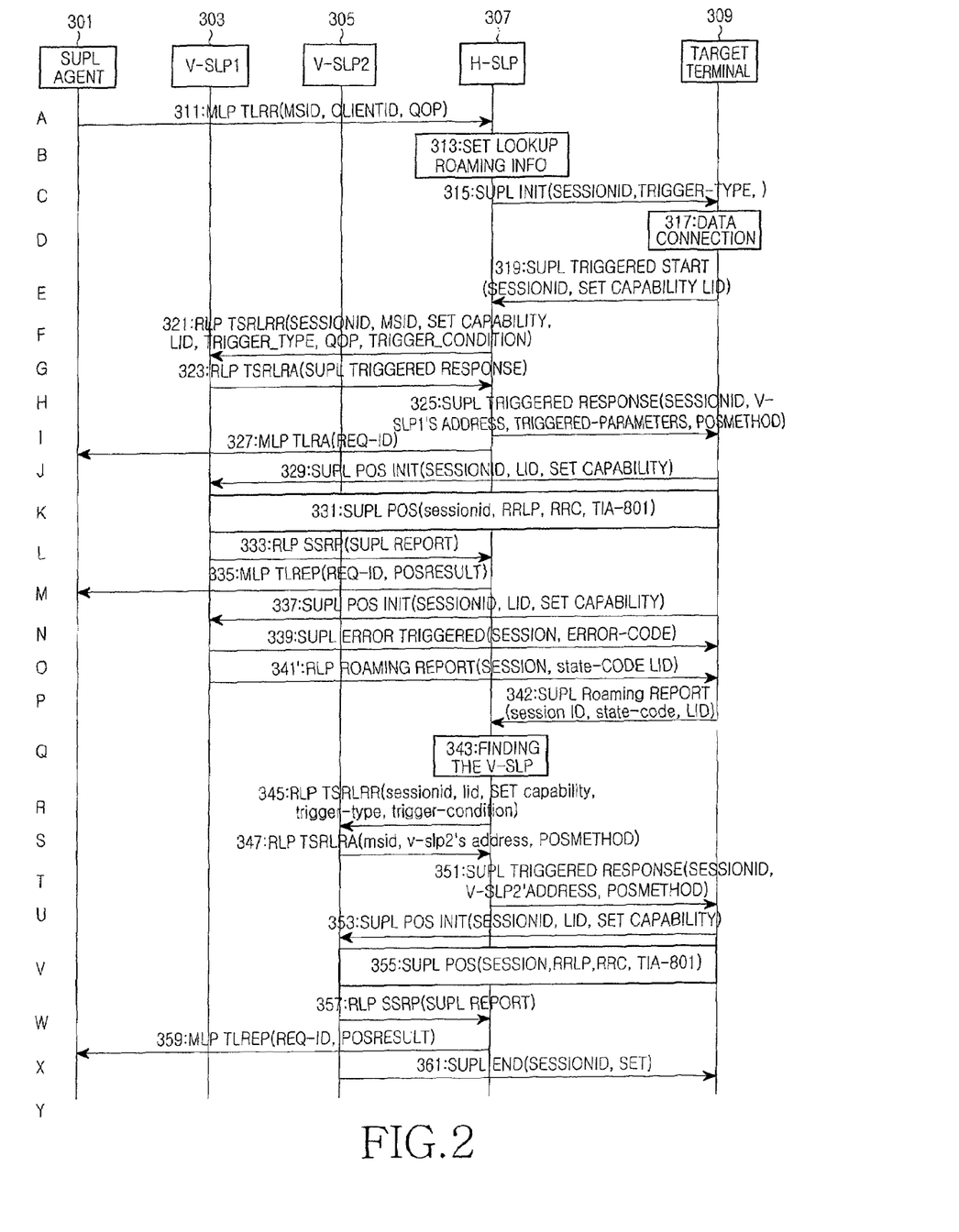
FIG. 2 is a flowchart illustrating an operating procedure of calculating a location value of a target terminal when the target terminal is in a roaming state and the current H-SLP can no longer calculate the location value according to an exemplary embodiment of the present invention.

FIG. 2 is a flowchart illustrating an operating procedure of calculating the location value of the target terminal according to an exemplary embodiment of the present invention when the target terminal is in a roaming state and the location value can no longer be determined.

FIG. 2 refers to an environment substantially identical to FIG. 1 in which the SUPL AGENT requests the location server for the location value of the target terminal, and the only difference is as follows.

In FIG. 2, the V-SLP1 transmits an RLP ROAMING REPORT message, reporting of the situation that the target terminal is in a roaming state so the target terminal cannot calculate the location value anymore, to the target terminal in step 341'. In FIG. 1, the V-SLP1 transmits the RLP ROAMING REPORT message to the H-SLP in step 341. The target terminal receiving the RLP ROAMING REPORT message transmits an SUPL REPORT to the H-SLP together with the LID as the information on the network in which the target terminal currently exists and a State-code indicating that the V-SLP1 cannot calculate the location value anymore in step 342.

Figure 3:
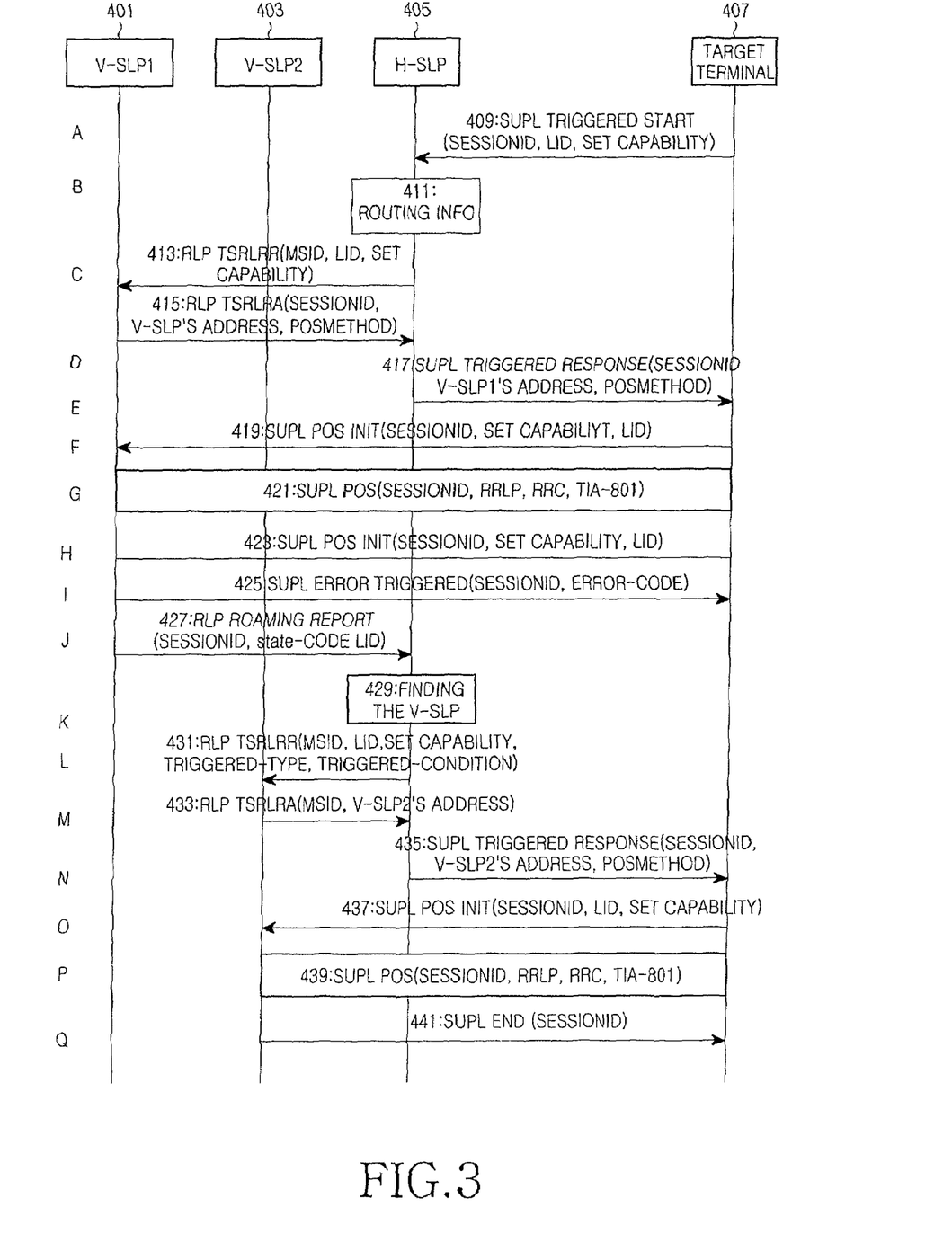
FIG. 3 is a flowchart illustrating an operating procedure of calculating a location value of a target terminal when the target terminal requests an H-SLP for its own location value according to an exemplary embodiment of the present invention.

FIG. 3 is a flowchart illustrating an exemplary operating procedure for calculating a location value of a target terminal when the target terminal requests an H-SLP of its own location value.

Referring to FIG. 3, an exemplary method for calculating the location value of the target terminal when the target terminal itself requests its own location value to the H-SLP is as follows.

A. The SUPL AGENT in the target terminal 407 transmits a message requesting the home location server (H-SLP) 405 for the periodic location value, the message also including the SESSION ID, the LID as the information on the network in which the target terminal currently exists and the method and protocol for calculating the location value by the target terminal (SET CAPABILITY) in step 409.

B. The H-SLP 405 determines if the target terminal is out of the range of the location in which the H-SLP 405 performs the positioning based on the LID in step 411.

C. If the target terminal is out of the range of the location in which the target terminal calculates the location value, the H-SLP 405 selects the location server for calculating the location value of the current target terminal based on the LID.

The H-SLP 405 requests the visited location server (V-SLP1) 401 of the location value together with the message including an MSID of the target terminal, the SET CAPABILITY and LID in step 413.

D. In step 415, the V-SLP1 401 accepts the request for the location value and transmits its own IP address. Further, the V-SLP1 401 determines the method and protocol for calculating the location value (POSMETHOD) based on the SET CAPABILITY.

E. The H-SLP 405 transmits the IP address of the V-SLP1 401 and the POSMETHOD of the positioning method and protocol to the target terminal 407 in step 417.

F. The target terminal 407 transmits the positioning inducing message to the V-SLP1 401 in step 419.

G. The target terminal 407 calculates the location value with the V-SLP1 401 in step 421.

H. When the period for calculating the location value arrives, the target terminal 407 transmits the positioning inducing message for calculating the location value in step 423. The message includes the LID as the information on the network in which the target terminal currently exists.

I. The V-SLP1 401 determines if the target terminal is out of the range of the location in which the V-SLP 1 401 can determine the location value based on the LID. In this case, the V-SLP1 401 transmits the message informing that the V-SLP1 401 cannot calculate the location value to the target terminal in step 425. The message is an SUPL ERROR TRIGGERED message and includes a currently generated ERROR CODE indicating that the current location server cannot calculate the location value in the location in which the target terminal exists.

J. The V-SLP1 401 reports the corresponding error to the H-SLP 405 in step 427. The V-SLP1 401 transmits the message including the ERROR CODE, informing that the target terminal moves and the V-SLP1 401 is out of the range of the location in which the V-SLP1 401 can determine the location value so that the positioning cannot be accomplished, and the LID as the network information transmitted from the target terminal to the H-SLP 405.

K. The H-SLP 405 selects an appropriate visited location server based on the LID in step 429.

L. The H-SLP 405 transmits a request to a newly selected location server (V-SLP 2) 403 for calculating the location value together with the message including the MSID of an identification of the target terminal, the SET-CAPABILITY of the positioning method of the target terminal, a TRIGGERED-TYPE of a kind of the triggered location service, a TRIGGER CONDITION, and the LID as the information on the network in which the target terminal currently exists in step 431.

M. The V-SLP2 403 determines the method and protocol for calculating the location value (POSMETHOD) by using the transmitted SET CAPABILITY, and transmits the determined POSMETHOD and its own IP address to the H-SLP 405 in step 433.

N. The H-SLP 405 transmits the IP address of the new V-SLP2 403 and the newly determined POSMETHOD to the target terminal 407 in step 435.

O. The target terminal 407 transmits the positioning inducing message to the new V-SLP2 403 in step 437.

P. The target terminal 407 and the new V-SLP2 403 calculate the location value in step 439.

Q. The V-SLP2 403 transmits the message informing of the interruption of the service to the target terminal 407 when the triggered location service is interrupted in step 441.

In the triggered location service, steps O to P are repeated during the remaining periods after the H-SLP is newly determined, and step Q is performed after the period is interrupted. It is described in steps I to N that the method for changing the H-SLP when the target terminal requests the H-SLP of its own location value. The steps in which the newly determined H-SLP and the target terminal calculate the location value after the H-SLP is newly determined are identical with previous steps O and P.

Figure 4:
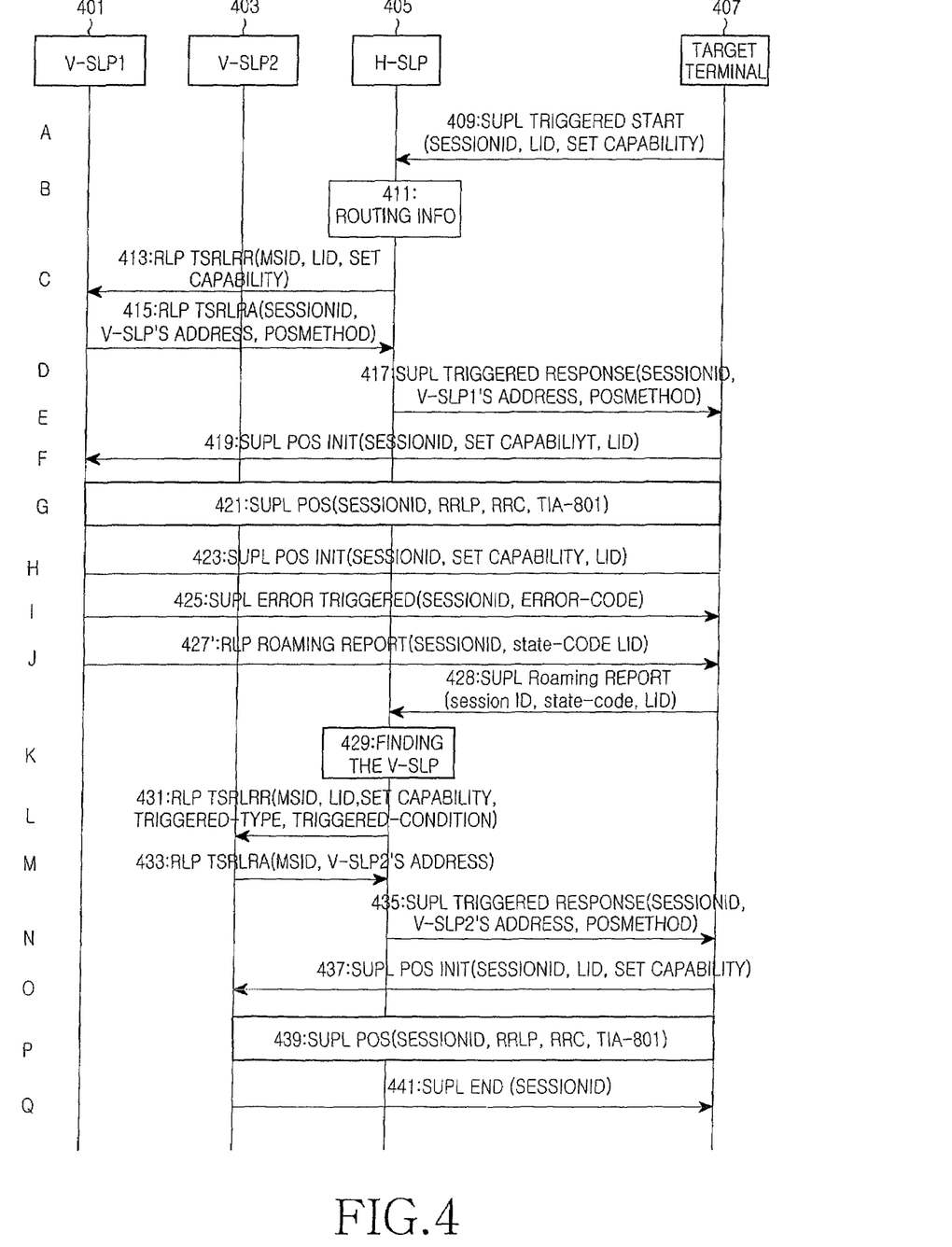
FIG. 4 is a flowchart illustrating an operating procedure of calculating a location value of the target terminal when the target terminal is in a roaming state and a current H-SLP can no longer calculate the location value according to an exemplary embodiment of the present invention.

FIG. 4 is a flowchart illustrating an exemplary operating procedure for calculating a location value of a target terminal when the target terminal is in a roaming state and the current H-SLP can no longer calculate the location value.

FIG. 4 illustrates a procedure substantially similar to that illustrated in FIG. 3, wherein the target terminal requests its own location value of the H-SLP.

In FIG. 4, the V-SLP1 transmits an RLP ROAMING REPORT message informing that the target terminal is in a roaming state and it cannot calculate the location value anymore to the target terminal in step 427'. In FIG. 3, the V-SLP1 transmits the RLP ROAMING REPORT message to the H-SLP in step 427. In FIG. 4, the target terminal receiving the RLP ROAMING REPORT message transmits the SUPL REPORT to the H-SLP together with the LID as the information on the network in which the target terminal currently exists and the State-code indicating that the V-SLP1 cannot calculate the location value anymore in step 428.

Accordingly, the present invention provides a method for changing a location server without interrupting an existing triggered location service when the target terminal moves during the triggered location service such that the location server can no longer determine the location value of the target terminal.

In the prior art, if the target terminal is in a roaming state and determines the location server once, it must calculate a location value with the determined H-SLP continuously. Therefore, when the target terminal is in a roaming state during the triggered location service and the target terminal cannot calculate the location value with the H-SLP which previously calculated the location value, the session of the current triggered location service is interrupted.

Therefore, the present invention provides a method for changing the H-SLP during the triggered location service. At this time, the previous H-SLP transmits the network information (LID) received from the target terminal to the H-SLP, and the H-SLP selects the new V-SLP based on the LID. Also, the H-SLP provides the new V-SLP with the ID of the target terminal, the positioning method (SET CAPABILITY) of the target terminal, and the current LID. The newly selected V-SLP determines the positioning method and protocol used for calculating the location value with the target terminal by using the SET CAPABILITY of the target terminal.

Further, the newly selected V-SLP transmits its own IP address, the newly determined positioning method and protocol (POSMETHOD) to the H-SLP. The H-SLP transmits the IP address of the newly selected H-SLP and the new POSMETHOD to the target terminal. And, the target terminal transmits the positioning inducing message to the new V-SLP and calculates the location value by using the newly determined POSMETHOD.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing triggered location information to a target terminal in a system, which comprises the target terminal and a home location server (H-SLP) having registered information of the target terminal, the method comprising:
(1) requesting a location value of the target terminal by a Secure User Plane Location AGENT (SUPL AGENT);
(2) exchanging a location service start message between the H-SLP and the target terminal;
(3) selecting a visited location server (V-SLP) for calculating the location value of the target terminal and transmitting information necessary for calculating a periodic location value of the target terminal to the selected V-SLP by the H-SLP;
(4) determining a positioning method (POSMETHOD) used for calculating the location value with the target terminal and transmitting the information of the V-SLP to the H-SLP by the V-SLP;
(5) transmitting the information of the V-SLP and the POSMETHOD to the target terminal by the H-SLP;
(6) transmitting a positioning inducing message to the V-SLP according to a positioning period by the target terminal;
(7) calculating the location value of the target terminal by the target terminal and the V-SLP;
(8) transmitting the calculated location value of the target terminal to the H-SLP by the V-SLP; and
(9) transmitting the calculated location value of the target terminal to the SUPL AGENT by the H-SLP.

2. The method as claimed in claim 1, further comprising:
(10) evaluating the positioning inducing message and determining if the target terminal is out of a range in which it calculates the location value with the V-SLP;
(11) transmitting an indication that the target terminal is out of the range for performing the positioning to the target terminal and the H-SLP by the V-SLP when the target terminal is out of the positioning range; and
(12) evaluating the indication received from the V-SLP and selecting a new V-SLP in the location in which the current target terminal exists by the H-SLP, wherein the indication includes a location identifier (LID) as the information on a network in which the target terminal currently exists.

3. The method as claimed in claim 1, wherein the step (2) comprises:
(a) transmitting at least one of a SESSION ID for identifying a communication session between the H-SLP and the target terminal, a triggered location service type and a triggered location service start message to the target terminal by the H-SLP; and
(b) transmitting a service allowance message for allowing start of the triggered location service by the target terminal, wherein the message comprises at least one of the SESSION ID, a SET CAPABILITY for indicating a method and protocol of the target terminal for performing the positioning and the LID as the information on a network in which the target terminal currently exists.

4. The method as claimed in claim 3, wherein the selecting of the V-SLP by the H-SLP in step (3) comprises using the LID received from the target terminal and transmitting the information necessary for calculating the periodic location value of the target terminal to the selected V-SLP.

5. The method as claimed in claim 1, wherein the information necessary for calculating the periodic location value of the target terminal comprises at least one of an MSID of the target terminal, the SESSION ID, the SET CAPABILITY, the LID, a TRIGGERED-TYPE indicating a kind of the triggered location service, and criteria of the triggered location service including at least one of a service start time, an end time, a location value reporting period, and an accuracy of the location value.

6. The method as claimed in claim 1, wherein the information of the V-SLP comprises at least one of the SESSION ID, an IP address of the V-SLP and an ID of the V-SLP.

7. The method as claimed in claim 2, wherein the positioning inducing message comprises the LID as the information on the network in which the target terminal currently exists.

8. The method as claimed in claim 7, wherein the evaluating of the positioning in step (10) comprises evaluating the LID and determining if the target terminal is out of the range in which the target terminal performs the positioning by the V-SLP.

9. The method as claimed in claim 7, wherein the LID comprises a CELL ID.

10. The method as claimed in claim 2, wherein step (11) comprises:
(i) transmitting an ERROR message to the target terminal by the V-SLP when the target terminal is out of the range in which the target terminal performs the positioning; and
(ii) transmitting the ERROR message comprising the LID as the information on the network in which the target terminal currently exists to the H-SLP by the V-SLP.

11. A method for providing triggered location information to a target terminal in a system that comprises the target terminal and a home location server (H-SLP) having registered information of the target terminal, the method comprising:
(1) transmitting a location value request message by the target terminal;
(2) evaluating the location value request message and determining if the target terminal is within a range in which the target terminal can perform positioning by the H-SLP;
(3) selecting a visited location server (V-SLP) for calculating a location value of the target terminal when the target terminal is out of the range in which the target terminal performs the positioning and transmitting information necessary for calculating a periodic location value of the target terminal to the selected V-SLP by the H-SLP;
(4) determining a positioning method (POSMETHOD) used for calculating the location value with the target terminal and transmitting the information of the V-SLP to the H-SLP by the V-SLP;
(5) transmitting the information of the V-SLP and the POSMETHOD to the target terminal by the H-SLP;
(6) transmitting a positioning inducing message to the V-SLP by the target terminal according to a positioning period;
(7) calculating the location value of the target terminal by the target terminal and the V-SLP; and
(8) transmitting the calculated location value of the target terminal to the H-SLP by the V-SLP.

12. The method as claimed in claim 11, further comprising:
(9) evaluating the positioning inducing message and determining if the target terminal is out of the range in which the target terminal performs the positioning with the V-SLP;
(10) transmitting an ERROR message to the target terminal and the H-SLP by the V-SLP when the target terminal is out of the positioning range in which the target terminal performs the positioning; and
(11) evaluating the ERROR message received from the V-SLP and selecting a new V-SLP in a location in which the target terminal currently exists by the H-SLP.

13. The method as claimed in claim 11, wherein the location value request message comprises at least one of a SESSION ID, a location identifier (LID) as the information on the network in which the target terminal currently exists, and a method and protocol of the target terminal for performing the positioning (SET CAPABILITY).

14. The method as claimed in claim 13, wherein the evaluating of the location value request message in step (2) comprises using the LID included in the location value request message by the H-SLP.

15. The method as claimed in claim 13, wherein the selecting of the V-SLP in step (3) comprises using the LID included in the location value request message by the H-SLP.

16. The method as claimed in claim 11, wherein the information necessary for calculating the periodic location value of the target terminal comprises at least one of an MSID of the target terminal, the SESSION ID, the SET CAPABILITY, the LID, a TRIGGERED-TYPE indicating a kind of the triggered location service, and criteria of the triggered location service including at least one of a service start time, an end time, a location value reporting period, and an accuracy of the location value.

17. The method as claimed in claim 11, wherein the information of the V-SLP comprises at least one of the SESSION ID, an IP address of the V-SLP and an ID of the V-SLP.

18. The method as claimed in claim 12, wherein the positioning inducing message comprises the LID as the information on the network in which the target terminal currently exists.

19. The method as claimed in claim 18, wherein, in step (9), the V-SLP evaluates the LID and determines if the target terminal is out of the range of the location in which the target terminal performs the positioning.

* * * * *